(12) United States Patent
Posnansky

(10) Patent No.: US 8,857,124 B2
(45) Date of Patent: Oct. 14, 2014

(54) WEATHERPROOF BUILDING ENVELOPE

(76) Inventor: Mario Posnansky, La Sage (CH)

(*) Notice: Subject to any disclaimer, the term of this patent is extended or adjusted under 35 U.S.C. 154(b) by 501 days.

(21) Appl. No.: 12/525,463

(22) PCT Filed: Jan. 30, 2008

(86) PCT No.: PCT/CH2008/000032
§ 371 (c)(1),
(2), (4) Date: Oct. 15, 2009

(87) PCT Pub. No.: WO2008/092290
PCT Pub. Date: Aug. 7, 2008

(65) Prior Publication Data
US 2010/0101157 A1  Apr. 29, 2010

(30) Foreign Application Priority Data
Jan. 31, 2007 (EP) .................................. 07405026

(51) Int. Cl.
*E04D 13/18* (2014.01)
*E04D 1/34* (2006.01)
*E04G 21/00* (2006.01)
*H01L 31/042* (2014.01)
*E04D 1/16* (2006.01)
*E04D 1/12* (2006.01)
*H01L 31/048* (2014.01)

(52) U.S. Cl.
CPC *E04D 1/16* (2013.01); *E04D 1/125* (2013.01); *H01L 31/0482* (2013.01); *F23J 2002/0061* (2013.01); *Y02B 10/12* (2013.01); *Y02E 10/50* (2013.01)
USPC ............. 52/547; 52/543; 52/173.3; 52/748.1; 136/244

(58) Field of Classification Search
CPC .......... E04D 1/025; E04D 1/04; E04D 1/125; E04D 1/16; E04D 1/34; E04D 1/36; E04D 3/06; E04D 3/3607; E04D 3/365
USPC .......... 52/518, 543, 546, 547, 549, 554, 552, 52/560, 173.3, 748.1, DIG. 16; 136/244, 136/251
See application file for complete search history.

(56) References Cited

U.S. PATENT DOCUMENTS

| 487,585 A | 12/1892 | Schetzel |
| 1,493,374 A * | 5/1924 | Mountford, Jr. ................ 52/547 |

(Continued)

FOREIGN PATENT DOCUMENTS

| CH | 0965/06 | 10/1922 |
| DE | 1 937 065 | 1/1971 |

(Continued)

OTHER PUBLICATIONS

Translation of DE 100 46 134 A1. http://translationportal.epo.org/emtp/translate/?ACTION=description-retrieval&COUNTRY=DE&FORMAT=docdb&KIND=A1&LOCALE=en_GB&NUMBER=10046134&OPS=ops.epo.org&TRGLANG=en&ENGINE=google&SRCLANG=de.*

*Primary Examiner* — Ryan Kwiecinski
(74) *Attorney, Agent, or Firm* — Michael J. Femal; Much Shelist

(57) ABSTRACT

The invention relates to a weatherproof building shell, especially a pitched roof, comprising a plurality of rectangular weatherproof shingles which are laid diagonally to mutually overlap in a scale-type fashion in relation to a line of slope. Shingles that overlap in an edge zone at a right angle to the line of slope are set off in relation to each other. The shingles are connected to a supporting structure in a lower corner zone of the shingle in relation to a line of slope, respective sealing elements being arranged on said corner zone of the shingle and obturating a gap between shingles that are arranged on the same level at a right angle to the main direction. The rectangular shingles have respective through-openings for fastening elements in two opposite corner zones so that the shingles are connected to the supporting structure in their lower and upper corner zones in relation to the main direction.

11 Claims, 3 Drawing Sheets

(56) References Cited

U.S. PATENT DOCUMENTS

| | | | | |
|---|---|---|---|---|
| 1,508,789 A * | 9/1924 | Harris | | 52/545 |
| 1,540,960 A * | 6/1925 | Sherman | | 52/543 |
| 1,574,345 A * | 2/1926 | Gates | | 52/547 |
| 1,612,718 A * | 12/1926 | Grice | | 52/546 |
| 1,618,077 A * | 2/1927 | Fulenwider et al. | | 52/548 |
| 1,626,780 A * | 5/1927 | Bickell | | 52/547 |
| 1,744,656 A * | 1/1930 | McDavitt | | 52/518 |
| 1,748,327 A * | 2/1930 | Black | | 52/543 |
| 1,765,197 A * | 6/1930 | Batcheller | | 52/98 |
| 1,819,717 A * | 8/1931 | Mangano | | 52/520 |
| 1,936,055 A * | 11/1933 | Heaney | | 52/543 |
| 2,008,575 A * | 7/1935 | Bussey | | 52/420 |
| 2,015,020 A * | 9/1935 | Rowe | | 52/546 |
| 2,164,636 A * | 7/1939 | Black | | 52/545 |
| 2,191,668 A * | 2/1940 | Knudsen et al. | | 52/553 |
| 2,351,993 A * | 6/1944 | Miles et al. | | 52/543 |
| 2,429,456 A * | 10/1947 | Leibrook et al. | | 52/546 |
| 3,371,457 A * | 3/1968 | Wienand | | 52/404.4 |
| 4,209,222 A | 6/1980 | Posnansky | | |
| 4,720,955 A * | 1/1988 | Kane | | 52/519 |
| 5,442,888 A * | 8/1995 | Ilnyckyj | | 52/524 |
| 5,990,414 A | 11/1999 | Posnansky | | |
| 6,505,451 B1 * | 1/2003 | Ksajikian | | 52/518 |
| 2005/0260786 A1 | 11/2005 | Yoshikawa et al. | | |
| 2008/0155928 A1* | 7/2008 | Weiss | | 52/546 |
| 2010/0083602 A1* | 4/2010 | Pollack | | 52/584.1 |

FOREIGN PATENT DOCUMENTS

| | | |
|---|---|---|
| DE | 100 46 134 A1 | 4/2002 |
| WO | WO-01/04436 A1 | 1/2001 |

* cited by examiner

WEATHERPROOF BUILDING ENVELOPE

TECHNICAL DOMAIN

The invention relates to a weatherproof building envelope, especially a sloped roof, with several quadrilateral weatherproof panels. Furthermore the invention relates to a panel for a building envelope and a kit for preparing a building envelope.

PRIOR ART

The use of solar radiation which is incident daily on rooves and facades of inhabited or uninhabited buildings for obtaining energy in the form of electric current and heat has already acquired great importance.

Due to the finite nature of fossil energy sources and also uranium, the development of inexhaustible energy sources such as that of the sun is of great importance for our future energy supply.

The reduction of burning and the increased replacement of fossil energy sources are however also necessary for ecological reasons.

Development in recent years has shown that large-scale recovery of solar power and heat is possible. Already the annual production of solar cells for generating power exceeds 1400 MW, corresponding to an area of roughly 14 $km^2$. The current annual rate of growth is roughly 40%. By the year 2004 6 million $m^2$ of collector area had already been installed on German rooves to recover heat. This is to be doubled by the year 2012.

While photovoltaic modules are being increasing installed on rooves at present, the coverage of roof sections by thermal collectors by installation of water-carrying absorbers has become common. Technical development for reasons of engineering costs and aesthetics is however leading increasingly to integration of solar systems in the roof skin, facades and skylights and shading means. Here the photovoltaic modules and thermal collectors are also assuming the roof and facade function.

It is increasingly large-area photovoltaic roof elements which are being used as a "solar roof" for a roof structure. One example of this is the roof element marketed by the German company SolarWorld AG. Special complex measures for attachment, but mainly for achieving watertightness, must be taken (side and transverse profiles, rubber seals, etc.). Thermal, generally water-carrying solar collectors are installed separately on or in the rooves. So-called air correctors are also known which are used as roof structures with the hot air produced mainly for drying hay. U.S. Pat. No. 5,990,414 discloses a very aesthetic version of overlapping roof singles for photovoltaic current generation.

The photovoltaic modules or roof elements themselves consist essentially of thin, flat, brittle silicon solar cells in strips or a plate-shape. To protect against mechanical and chemical damage the cells are embedded in an elastic transparent material, generally EVA (ethyl vinyl acetate) between the forward transparent front side of hardened glass or plastic and a rear foil or glass. The solar cells are electrically interconnected to one another so that the generated module voltage can be tapped by way of a junction box generally located on the back. A host of these modules or roof elements are further connected in series and in parallel in order to obtain the system voltage or DC power desired at the time. Generally the current is fed into the public grid via an inverter or is temporarily stored in batteries in small satellite installations.

So-called thin layers of amorphous silicon, $CuS_2$ or other semiconductor materials or chemical compounds are known which likewise are used to build modules or roof and facade elements. These layers are applied to glass or transparent plastic, on the front and/or back plastic films being used to protect against mechanical or chemical effects.

Solar systems are known, but to date have hardly been used, in which the solar radiation is used for heating of water flows or air flows guided in piping systems and at the same time current is produced by means of photovoltaics.

The total costs of rooves equipped with solar systems are very high and thus an important advantage of multifunctionality is called into question. The functionality and heat yield are unsatisfactory, likewise the aesthetic circumstances and the suitability for building standardized rooves. Neither are the known systems suitable for the mass production which is necessary for reducing the costs of energy generation. They generally also have complex structures for roof integration. The energy recovering roof elements which replace conventional roof elements (tiles, shingles, etc.) would have to be able to be made and installed more economically. All the aforementioned factors adversely affect the economic efficiency of combined current/heat recovery.

DESCRIPTION OF THE INVENTION

The object of the invention is to devise a weatherproof building envelope which belongs to the initially mentioned technical domain, with several quadrilateral weatherproof panels which allows use of solar energy, and at the same time is aesthetically pleasing.

This object is achieved by the features of claim 1. As claimed in the invention, the panels are installed with respect to the line of slope in a diagonal position with scale-like mutual overlapping. The overlapping is dimensioned such that water cannot travel through to the inside under the overlapping. As a result of the diagonal position the panels which overlap transversely to the line of slope in the edge region are offset to one another. The panels are connected to a bearing structure on one corner area which is underneath with respect to the line of slope. In the indicated corner region of the panel there is furthermore a sealing element which closes the gap between the panels arranged transversely to the main direction at the same height.

The system as claimed in the invention is simple in structure and can implement different technical functions. Thus the panels can be equipped with solar cells to obtain electrical energy. They can also be used solely to obtain thermal energy. It is important that the system is fundamentally designed such that the arrangement of panels can be varied from application to application, so that for given panel dimensions the most varied (individual) dimensions of the building envelope can also be implemented in a weatherproof and aesthetically satisfactory manner. In particular, the pattern of "side by side" panels laid square ("bathroom tile pattern") which many considered unattractive can be avoided.

The invention is suitable mainly for sloped rooves. But facade linings are also possible. The incline of the line of slope should be at least so great that the water which hits the corresponding part of the building envelope cannot penetrate, but runs off exclusively to the outside.

In contrast to many known solar roof constructions, the construction as claimed in the invention does not require two separate envelopes. Rather weather protection and energy recovery are in a single envelope, specifically in the anchored panels which are arranged as claimed in the invention.

In this case those panels are called "directly adjacent" which overlap over a certain length of the edge region (and not only in a corner region). Those panels are called "indirectly adjacent" which are typically next to one another at the same height with respect to the line of slope, but do not overlap.

A diagonal position is defined as the arrangement in which a lozenge which in the direction of the line of slope is standing on its tip is formed when the centers of the directly adjacent panels are connected.

Preferably the quadrilateral panels in two opposite corner regions each have a through opening for a fastener. The panels are thus connected to the bearing structure on their corner regions which lie at the top and bottom in the direction of the line of slope. The connecting element can be a bolt, a screw, a hood or other element which is suitable for attaching the panel securely against storms.

The panels can also be made without through openings when for example a clamping element which encompasses the edge is used for their attachment. It is also conceivable that on the main surface of the panel facing the inside of the building a peg element, eye element or similar element is attached which interacts with a fastener which is attached on the bearing structure.

The panels as claimed in the invention preferably have a glass panel which forms the outside of the building. It is long-lived and best withstands weather effects. To be able to use solar energy, the panel is additionally equipped with solar cells. They have a square shape and are housed in the solar cell region of the panel. They can completely cover the surface. But versions of arrangements are also possible in which the solar cells have a certain mutual distance so that some of the sunlight is passed through the panel. The solar cell region is typically square and has a certain distance to the edge of the panel. The edge region which surrounds the solar cell region is dimensioned according to the required overlapping of the installed panels. It is for example a few centimeters.

It is desirable for the roof of a building to engender a uniform impression. The panel system as claimed in the invention therefore includes not only panels with, but also those without solar cells. The panels with solar cells are installed at sites exposed to the sun and the panels without solar cells on the side facing away from the sun. Furthermore, in the system there are also panels which are free of solar cells for the edge termination of the roof. These panels are generally not square or rectangular, but for example triangular. The shape of these panels can arise by division of the regular (for example, square) panel shape parallel to a diagonal line into two unequal parts.

The panels without solar cells can be used to recover thermal solar energy by their allowing the sunlight to be incident on a black substrate (foil) under the glass panel, and the heat produced by the foil can be carried off with an air flow and can be used by way of a heat exchanger housed for example in the roof gable (compare application CH 965/06 dated Jun. 14, 2006).

The quadrilateral shape is generally a square. But rectangular or other shapes are also possible (for example, rhombus). The square shape is preferred because the solar cells are normally square at present and because the best use of the roof surface or wall surface for recovering energy is thus possible.

For square panels (and correspondingly a square solar cell region) novel installation without loss of energy yield can be achieved when the edge region is widened in one corner region of the panel. Instead of providing $n^2$ solar cells, there are only $n_2-1$ solar cells, i.e. one solar cell is absent in one corner.

The invention is therefore not limited to the solar cell region overall having the same shape as the panel.

For the diagonal position as claimed in the invention with scale-like mutual overlapping, in principle three arrangements are conceivable.

A: The panels arranged transversely to the direction of the line of slope at the same height are mutually spaced. The center points of the directly adjacent panels form the corners of a lozenge which has been widened transversely to the line of slope.

B: The panels located transversely to the direction of the line of slope at the same height touch one another on a straight line. The center points of the directly adjacent panels form the corners of a square ("boundary case").

C: The panels located transversely to the direction of the line of slope at the same height would overlap if they were square. The center points of the directly adjacent panels form the corners of a lozenge squashed transversely to the line of slope. So that the panels do not overlap, the corners which lie at the same height with respect to the line of slope are cut off.

Within the framework of this invention, version A is preferred. It has the advantage that with the same panel geometry different roof geometries can be covered without a change having been undertaken in the installation principle. If for example the width of the roof has not been correctly recorded in planning, when the panels are installed simply the distance between the panels located at the same height can be made somewhat larger or smaller than planned. The overall impression of panel installation does not change for the viewer.

Since the roof system as claimed in the invention is to be suited to thermally using solar energy and especially with an air stream routed under the outer envelope of the building in a flat gap the sealing element is to be made such that air cannot penetrate or exit between the panels which are adjacent at the same height with respect to the line of slope. The sealing element is for example a plastic part which has the same thickness as the panels, and which is matched to the external shape of the panels in the region of their corners which lie at the same height. The sealing element is preferably attached to the fastener for the panels. It is preferably inserted under the lower corner of the upper panel.

Preferably the sealing element has a through opening for the fastener and is panel-shaped.

The system as claimed in the invention for preparing a building envelope which uses solar energy is based preferably on a quadrilateral, preferably square panel which has a pane of glass or a glass-like material and two diametrically opposite corner regions which are each provided with one through opening for a fastener. As is apparent from the aforementioned explanations, the system is not however limited to these panels.

The invention also comprises a kit for preparing a building envelope which is suitable for use of solar energy. The kit includes the aforementioned rectangular weatherproof panels which can be installed with respect to the line of slope in a diagonal position with scale-like mutual overlapping. Furthermore the kit includes fasteners to connect the panels to a bearing structure on one corner region at a time which lies underneath with respect to the line of slope. Furthermore the kit also comprises sealing elements to be arranged at the indicated corner region of the panel and to close the gap between the panels which are located transversely to the main direction at the same height.

The building envelop as claimed in the invention and the kit for preparing it can be regarded as a part of an overall system for use of solar energy.

One preferred embodiment consists for example in that at a distance from an underroof, transparent glass roof panels or those equipped at least partially with solar cells made flat are installed and sealed and form an airtight flat gap which is largely free of barriers in the flow direction (no roof eaves). There are at least one inlet opening for cold air, at least one exit opening for hot air and an airtight outer roof border or airtight side boundary of the flat gap.

In this embodiment an air flow is routed through the flat gap which supplied cold and used hot is released again into the atmosphere. In certain cases closed circuits can also be installed and are operated with air or some other gaseous medium.

The distance between the underroof which is made flat (without the conventional roof eaves) and the glass roof panels as claimed in the invention is preferably in the region of 15-30 mm. The distance is determined based on design parameters such as for example the desired temperature increase, the height of the roof, the thermal efficiency to be expected and the established air velocity.

According to one version the flat gap can widen to the top. This is especially the case when the glass roof panels become narrower to the top (peaked roof).

As mentioned, the quadrilateral (especially square) glass roof panels perform the function of roofing materials, especially tiles.

For glass roof panels which are made rectangular they are laid mutually overlapping and sealed so that an airtight flat gap is ensured. Laterally lengthwise profiles are attached which ensure tightness, adherence to the distance, and attachment.

Cost savings arise especially in that runoff of rain water is ensured without any further measure, i.e. that profiles and the like for lateral sealing are omitted. This version is especially suited for mass production and can be installed economically.

The square glass roof panels are aesthetically pleasing as roof elements and are used for covering the entire roof including any auxiliary rooves (even without energy recovery). The glass roof panels can be used not only for recovery of current and heat, but also can be configured for light incidence (skylight function) (translucid roof elements).

The glass roof panels can also be held, sealed, installed and supported with a frame. The frame for its part comprises attachment feet which in turn should not hinder air passage.

Since the square glass roof panels installed as claimed in the invention replace a conventional roof, they should also be made watertight for storms and should satisfy snow load requirements. It should be also possible to walk on the glass roof panels.

These glass roof panels can be used as follows as claimed in the invention for the roof structure.

As conventional glass roof panels—transparent or opaque—for covering roof parts where energy is not used. This applies to square roof panels which can be installed aesthetically and easily. The glass roof panels which overlap as claimed in the invention are attached at two corners using a specially made device to the underroof and at the same time are pressed onto one another to achieve tightness.

As thermal glass roof panels for use of heat by heating of the air flow in the underlying air gap. In this case the glass roof panels are transparent to full solar radiation. The radiation is absorbed by a selectively coated absorber (located under the glass roof panel) which is used for direct, efficient heating of air to high useful temperatures (up to 100° C.).

As "photovoltaic glass roof panels" with and without simultaneous heat use (if heat is not obtained with the air flow in the gap which lies behind, it is especially suitable for performance-enhancing cooling of the cells [sic]. The air is heated on the back of the glass roof panels, and useful temperatures up to 55° C. can be achieved.

As transparent glass roof panels with a "skylight function",

As partially transparent glass roof panels with photovoltaic power generation (skylight shaded by the cells), underroof transparent or only with the roof beams.

As a partially transparent glass roof panel for photovoltaic and thermal energy use.

As the roof structure roof sections can be installed with only a thermal or only an electrical function or only a skylight function. Roof sections can also be provided with an electrical-thermal function (air temperatures up to 50° C.) and with downstream purely thermal glass roof panels for achieving high temperatures at the output. The thermal roof panels thus act as "boosters". Other combinations for use of glass roof panels are likewise possible in conjunction with the transparent or partially transparent properties.

In particular with the roof structure as claimed in the invention consisting of square, aesthetic glass roof panels it is possible to build ultramodern, multifunctional rooves in which current is produced at the same time and fossil fuels for obtaining heat are replaced. By mass production of these roof elements in combination with the use of heat, in the installation of dozens of square kilometers interesting prerequisites for large-scale economical use of solar energy can be achieved worldwide. In Switzerland alone the full-scale shift to inexhaustible green energy sources can take place when 10% of roof and facade surfaces of the currently existing total area of 700 km$^2$ are used. Currently 12 km$^2$ roofs are rebuilt or rehabilitated annually in Switzerland. In Germany the aforementioned numbers are ten times larger.

Embodiments of the different glass roof panels are described below using the example of square, double-overlapping glass roof panels.

Glass roof panel with a simple roof function. It consists of a glass panel hardened on the front with a film laminated onto the back for coloring, and fasteners and/or pressing elements on the four corners. For this function however also other materials can be used with the same geometrical structure and fastening technology.

If the glass remains transparent, the glass roof panel can be used with a skylight function.

Glass roof panel with purely thermal function. It consists of hardened glass with the same geometrical structure and fastening technology.

Glass roof panel with photovoltaic function. It consists of a photovoltaic cell laminate according to the initially described combination of layers (silicon cells or thin layer cells).

Glass roof panel with photovoltaic function and light passage, as well as the same geometrical structure and fastening technology. They consist of a photovoltaic laminate according to the combination of layers described farther above, the solar cells being electrically connected to one another while maintaining the distance between the cells for light transmission. The geometrical structure and fastening technology in turn remain the same.

Other advantageous embodiments and combinations of features of the invention will become apparent from the following detailed description and the totality of the patent claims.

BRIEF DESCRIPTION OF THE DRAWINGS

The drawings used for explanation of the exemplary embodiment are schematic.

FIG. 3a shows a detailed view of one region of the partial area of FIG. 1;

FIG. 3b shows a sectional view through the detailed view of FIG. 3a;

FIG. 5a shows a top view of one panel of the building envelope in the version as a photovoltaic module;

FIG. 5b shows a sectional view of the panel of FIG. 5a.

Fundamentally the same parts are provided with the same reference numbers in the figures.

EMBODIMENTS OF THE INVENTION

Figure 1:
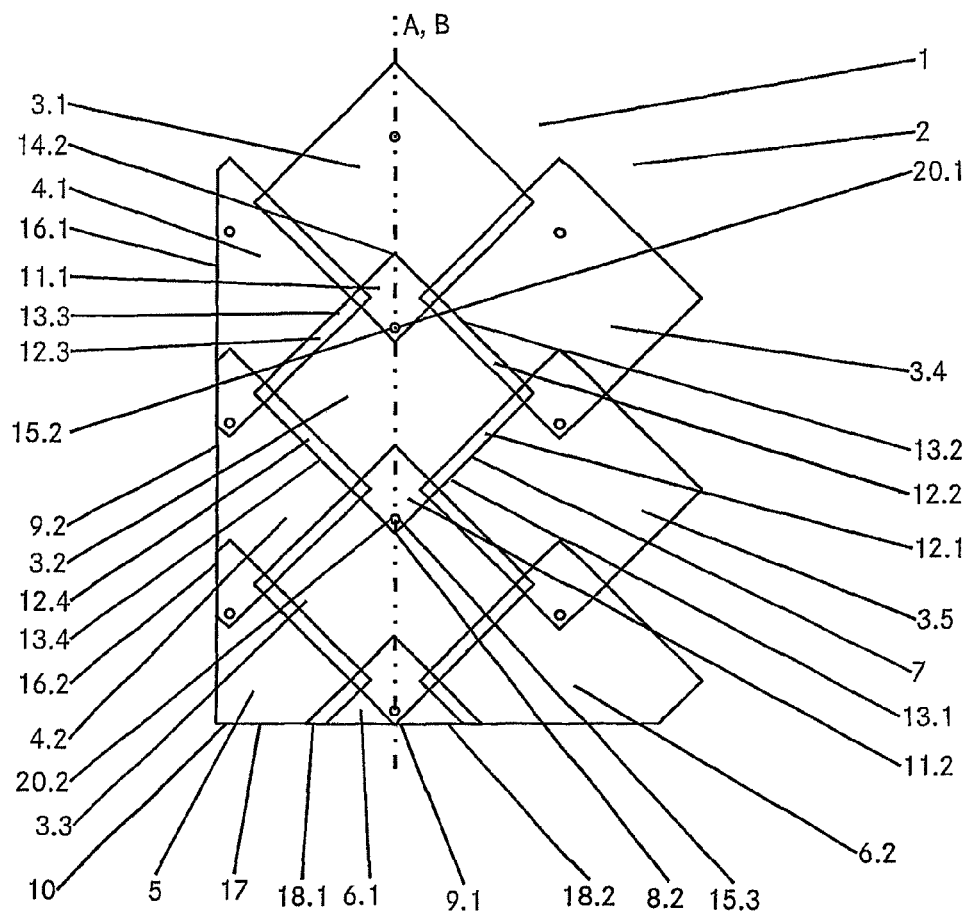
FIG. 1 shows a partial area of a building envelope.

FIG. 1 shows a partial area 1 of a covering 2 comprising several panels 3-6 as claimed in the invention which together form a region of a building envelope as claimed in the invention. This building envelope can be for example a roof or also a facade of a building or any other conceivable useful surface for solar energy. The partial area 1 has a lower edge 9.1 which lies transversely with respect to the line of slope A and an edge 9.2 which is aligned parallel to the line of slope A. The edges 9.1 and 9.2 come together at a right angle and form a corner 10 of the partial area 1. The individual panels 3-6 underlie a basic shape 7 which is rhomboidal with respect to the line of slope. In particular the basic shape 7 of the individual panels 3-6 is formed by a square shape which stands on one corner 8 such that one corner 14 opposite this end likewise lies on the line of slope A. Not each panel 3-6 has the complete basic shape 7. Depending on its arrangement in the covering the panels 3-6 can have different shapes. FIG. 1 shows base panels 3, edge panels 4 of the line of slope, transverse edge panels 6 and corner panels 5. The base panels 3 have a complete square shape which stands on the corners 8, i.e. a complete basic shape 7.

The panels 4 of the line of slope are located in the edge region 9.2 of the partial area 1. The shape of the edge panels 4 of the line of slope arises from a straight division of the square regular basic shape 7, for example of a base panel 3, parallel to the line of slope A. The transverse edge panels 6 are located in the edge region 9.1 and have different shapes which arise by straight division of the square regular basic shape 7, for example of a base panel 3, perpendicular to the line of slope A. In the corner region 10 in which the edge regions 9.1 and 9.2 which are arranged perpendicular to one another abut one another, there is the corner panel 5. The shapes of the panels 3-6 are detailed below.

The base panels 3 each have six adjacent panels (base panels 3.1, 3.3, 3.4, 3.5 and edge panels 4.1 and 4.2 of the line of slope) and are shaped in the same way. The panel arrangement of the covering 2 is described below using a base panel 3.2 selected by way of example.

The base panels 3.1-3.5 are arranged in the direction of the line of slope A to one another such that the base panels 3.1 and 3.3 adjacent to the base panel 3.2 overlap in the square corner regions 11.1 and 11.2 with the base panel 3.2. In FIG. 1 the corner regions 11 take up a small part of the total area of the base panel 3.2, especially roughly one ninth or one sixteenth of the total area.

Perpendicular to the line of slope A four laterally adjacent panels border the base panel 3.2 (base panels 3.4 and 3.5 and edge panels 4.1 and 4.2). The adjacent panels are arranged shifted relative to the base panel 3.2 by a half diagonal length of the basic shape 7 in the direction of the line of slope A. In the vertical direction to the line of slope A the adjacent panels are spaced such that overlapping regions 12.1-12.4 are formed which are arranged parallel to the corresponding overlapping edges 13.1-13.4 of the base panel 3.2. The regions 12 perpendicular to the edges 13 have a dimension which is comparatively small compared to the edge length. In particular the dimension of the regions 12 perpendicular to the edges 13 corresponds to roughly one tenth of the edge length of the base panels 3.2. The width of the regions 12 is preferably not less than 2 cm.

With respect to the line of slope A the two edge panels 4.1 and 4.2 and the two base panels 3.4 and 3.5 are each located on the same side of the base panels 3.2. The overlapping regions 12.3 and 12.4 lie in the region between the base panel 3.2 and edge panels 4.1 and 4.2 and the regions 12.1 and 12.2 between the base panel 3.2 and base panels 3.4 and 3.5.

The base panel 3.2 in the region of the lower corner 8.2 has a through opening 20.2. The through opening 20.2 is located near the corner 8.2 such that it lies in the corner region which is formed by imaginary continuations of the overlapping regions 12.1 and 12.4. Furthermore, the base panel 3.2 in one region on the corner 14.2 opposite the corner 8.2 likewise has a through opening 15.2 which in the overlapping arrangement with the adjacent base panel 3.1 in the line of slope A is located congruently with its through opening 20.1. Likewise the through opening 20.2 is arranged congruently with the through opening 15.3 of the base panel 3.3.

The edge panels 4.1 and 4.2 of the line of slope have a shape which is formed by straight division along the dividing lines 16.1 and 16.2 of a panel which corresponds to the shape of the base panel 3.2 in the direction of the line of slope A. The edge panels 4.1 and 4.2 of the line of slope form a termination of the covering 2 to the edge region 9.2 which is parallel to the line of slope. The dividing line 16.1 and 16.2 does not pass through the through openings of the edge panels 4 of the line of slope, which openings correspond to the through openings 20 and 15, so that the edge panels 4 of the line of slope have through openings which correspond to the base panels 3. The dividing lines 16 coincide with the edge 9.2. The edge panels 4.1 and 4.2 of the line of slope are made with the same shape.

The transverse edge panels 6.1 and 6.2 have a shape which is formed by straight division along the dividing lines 18.1 and 18.2 of a panel which corresponds to the shape of the base panel 3.2 transversely to the line of slope A. The transverse edge panels 6.1 and 6.2 form a termination of the covering 2 to the edge 9.1 which is perpendicular to the line of slope A. The location of the dividing lines 18.1 and 18.2 depends on the arrangement of the base panels 3 which are located nearest the edge region 9.1 in the direction of the line of slope A. Depending on the distance, the dividing lines 18.1 and 18.2 are made coinciding with the edge 9.1 so that the transverse edge panels 6 yields an edge 9.1 which passes through in a straight line. The transverse edge panels 6.1 and 6.2 are therefore not made in the same shape and differ from the panels which are adjacent in the direction perpendicular to the line of slope A as a result of the half diagonal shift described above.

The corner panel 5 has a shape which is achieved for example by repeated division of the shape of the edge panels 4 of the line of slope in the direction perpendicular to the line of slope A. The location of the transverse dividing line 17 is chosen such that it coincides with the edge 9.1 or with the dividing lines 18.1 and 18.2 of the transverse edge panels 6.1 and 6.2. The border-side edges of the corner panel 5 thus form the corner 10 which is bordered by the edges 9.1 and 9.2.

Figure 2:
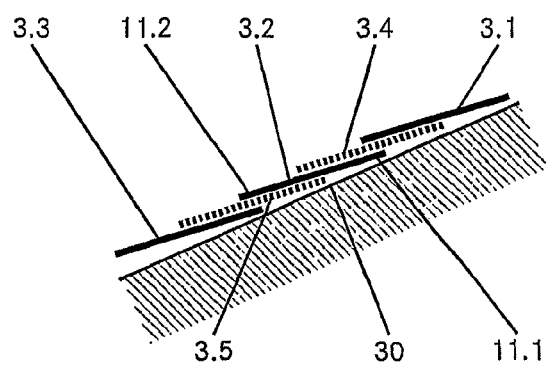
FIG. 2 shows a sectional view through the partial area of FIG. 1.

FIG. 2 shows a sketch of the arrangement of the base panels 3.1 to 3.3 in the direction of the line of slope A with reference to the sloped covered area 30, for example a sloped roof. The view of FIG. 2 corresponds to a rough sketch of a sectional view in one plane B in which the line of slope A lies and which is perpendicular to the covered surface 30. As is apparent from FIG. 2, the base panel 3.1 lies in the overlapping region 11.1 over the base panel 3.2, i.e. on the side facing away from the surface 30. In the region 11.2 in turn the base panel 3.2 lies over the base panel 3.3. The location of the panels 3.4 and 3.5 and 4.1 and 4.2 are shown by the broken line in FIG. 2. The panels 3.4, 3.5 and 4.1, 4.2 are arranged such that they are located at least partially in the regions 11.1 and 11.2 between the overlapping base panels 3.1 and 3.2 and 3.3 which are adjacent in the direction of the line of slope A. In the covering 2 as claimed in the invention all the panels 3-6 are located in the direction of the line of slope A according to the overlapping diagram shown in FIG. 2.

Figures 3A, 3B:
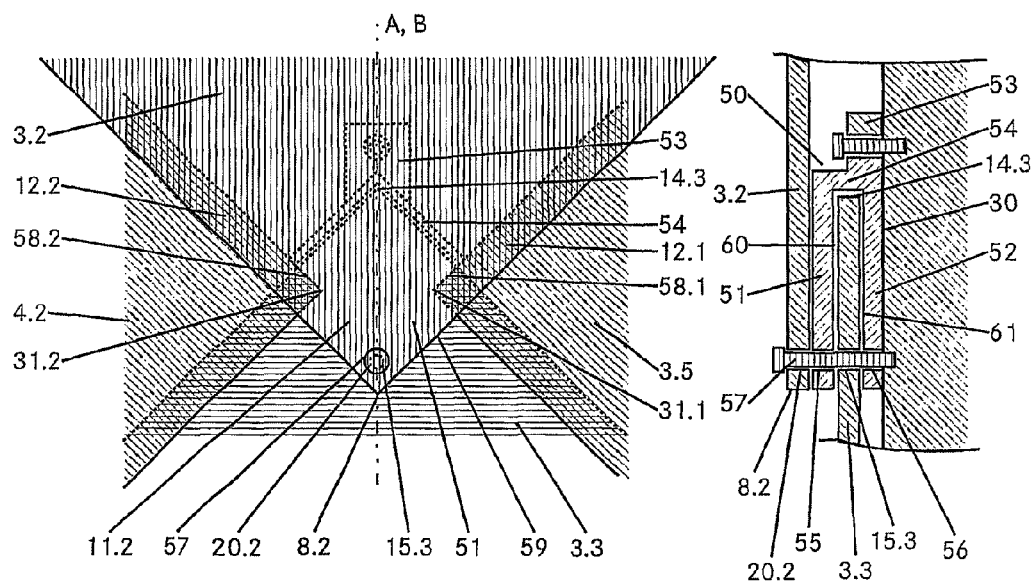

FIG. 3*a* shows an enlarged view of the overlapping region 11.2. FIG. 3*b* shows a sectional view of the same region in the pane B. The two figures are described jointly below.

In the overlapping region 11.2 between the base panels 3.2 and 3.3 there is a sealing element 51. The sealing element 51 is shaped such that it essentially fills the intermediate space formed by the panels 3.2, 3.3 and the panels 3.5 and 4.2 located partially in between. The sealing element 51 for this purpose is formed in the region between the panels 3.2 and 3.3 as a sealing panel. The thickness of the sealing panel 51 perpendicular to the panel surface corresponds to the thickness of one of the panels 3-6, especially the panels 3.5 and 4.2. The panel 51 has a double lozenge shape 59, to a certain extent a "butterfly shape" which is formed by two overlapping square outlines. The lengthwise direction of the double lozenge shape 59 is located in the direction of the line of slope A, and corners 31.1 and 31.2 of the panels 3.5 and 4.2, which corners lie between the base panels 3.2 and 3.3, are located in the lateral indentations 58.1 and 58.2 of the "constriction" of the double lozenge shape 59.

Preferably the sealing element 51 is molded on a holding element 50 which partially encompasses a region on the upper corner 14.3 of the panel 3.3 and continues underneath the panel 3.3 in the base panel 52. The base panel 52 is between the panel 3.3 and the covered surface 30. The bottom panel 52 continues in the direction of the line of slope A toward the top in an attachment clip 53 on which the holding element 50 can be attached to the surface 30. The holding element 50 thus in addition to the sealing function by the sealing element 51 also has the function of a hook element or holding element which keeps the panels 3-6 on the respective upper corner region on the respective corner 9. The bottom panel 52 can have for example the same outline as the sealing panel 61 and can be connected via side walls 54 to them such that between the side walls 54, bottom panel 52 and sealing element 51 a receiving space 60 for the corner region on the corner 9 is formed. The side walls 54 keep the bottom panel 52 and the sealing panel 51 at the desired distance. The receiving space 60 can be made here such that the inside 61 of the bottom panel 52 has a variable thickness such that the tilt of the panel 3.3 relative to the surface 30 is considered and the panel 3.3 rests flat in the receiving space 60 on the inside 61. Accordingly then the sealing element 51 lies parallel to the inside 61 in order to create a receiving space 60 which corresponds to the corner region at the corner 14.3 of the panel 3.3. For the sake of simplicity however FIG. 3*b* does not show the tilt of the panels 3.2 and 3.3 relative to the surface 30. In conjunction with FIG. 2 it is however apparent how the tilts of the panels relative to the surface 30 can be taken into account.

The panels 3.2 and 3.3 are arranged in the covering 2 such that the through openings 20.2 and 15.3 are aligned with one another. For the corresponding through openings 55 in the sealing element 51 and possibly also a through opening 56 in the bottom panel 53 of the holding element 50, a fastener 57 can pass through the opening 20.2, 55, 15.3 and 56 and can be anchored in the surface 30. The fastener 57 in this connection can be a screw, rivet, or some other known fastener 57. But it is also conceivable for the fastener 57 to be anchored only in the sealing element 51 and the panel 3.3 to be located only in the holding element 50 and not further fixed on the holding element 50. Altogether then fixing of the panel 3.3 can be achieved by the panel 3.3 on its through opening 20.3 being connected to the holding element 50 with another (not shown) holding element according to panel 3.2.

Figures 4A, 4B:
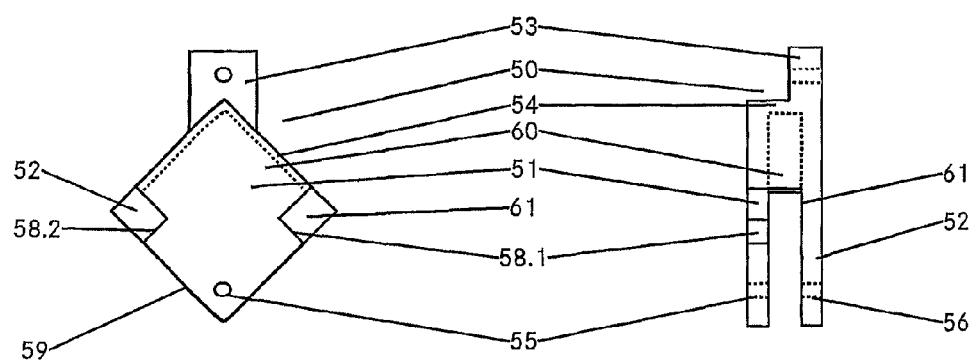
FIG. 4a shows a top view of a holding element.
FIG. 4b shows a side view of a holding element.

FIGS. 4*a* and 4*b* each show an outside view of a holding element 50 with a sealing element 51 without panels of a covering, in FIG. 4*a* a top view and in FIG. 4*b* a side view being shown. The arrangements of the holding elements 50 of FIGS. 4*a* and 4*b* correspond largely to FIGS. 3*a* and 3*b*.

The bottom panel 52 is made square, as is shown in FIG. 4*a*. The sealing panel 51 conversely has indentations 58.1 and 58.2 for corners 31.1 and 31.2 other panels.

Figures 5A, 5B:
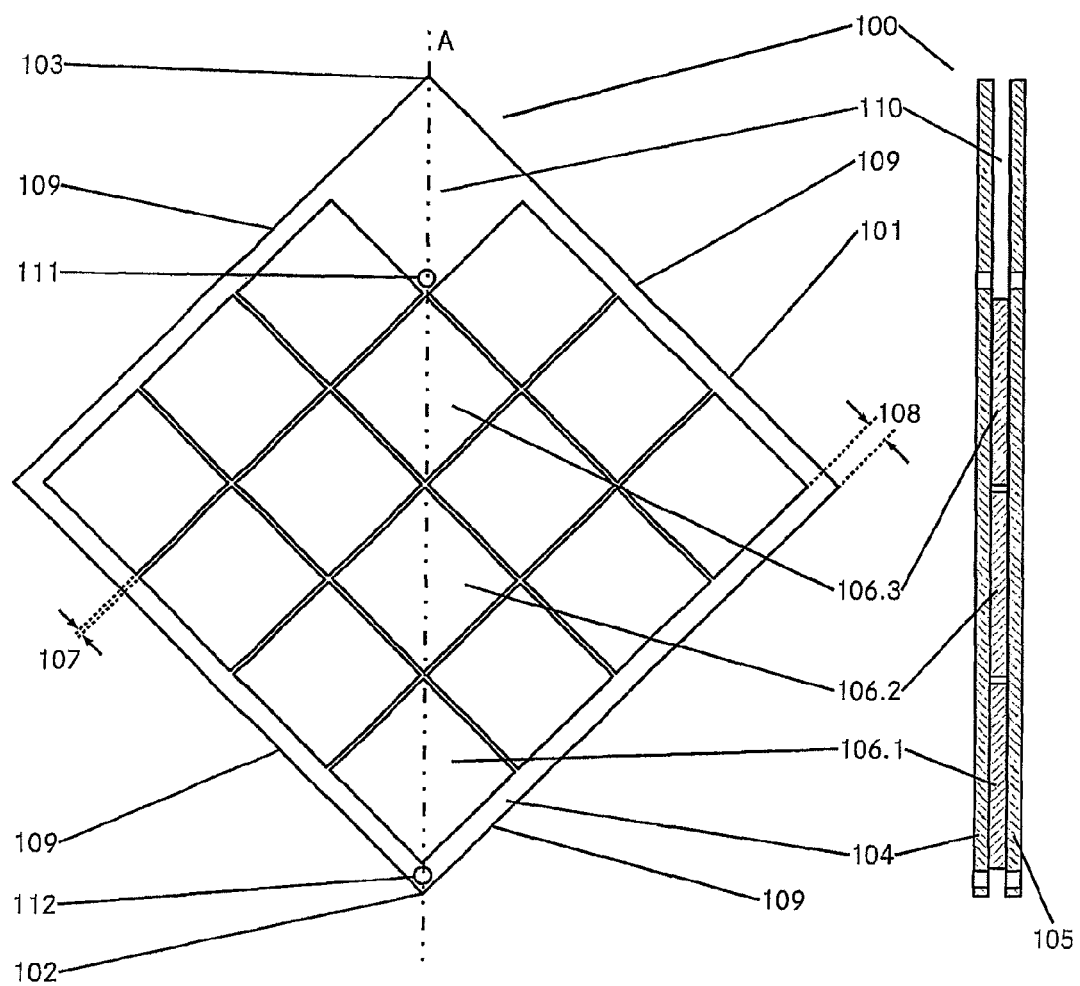

FIG. 5*a* shows a base panel 100 which is made as a solar panel or photovoltaic module. The base panel 100 has a square outline 101 with edges 109, which is located with respect to the line of slope A such that it stands on one corner 102 and the opposing corner 103 lies on the line of slope A which passes through the corner 102. The direction to the corner 102 is called "down" and the direction to corner 103 is "up". FIG. 5*b* shows a section through the panel 100 along the line of slope A (in the plane B).

The base panel 100 comprises a square panel 104, for example of plastic or glass. The panel 104 lies on the outside, i.e. for installation according to the base panels 3 of FIGS. 1-3 on the side facing away from the surface 30. On the back, i.e. on the side facing the surface 30, a film or another glass or plastic panel 105 can be applied. Between the panels 104 and 105 there are solar cells 106.1-106.*n* which are made in FIGS. 5*a* and 5*b* as square panes. The solar cells 106 can however also be made as strips or in any other suitably appearing shape. In FIG. 5 there are 15 solar cells 106 which each have a square outline. The square solar cells 106 are located in a regular 4×4 pattern with edges aligned parallel to the edges 109 of the base shape 101. Adjacent solar cells 106 have a first distance 107 to one another. The solar cells which lie on one edge of the square basic outline 101 of the base panel 100 are moreover spaced by the distance 108 from the edge of the base outline 101. On the top corner 103 a square region 110 is left clear (i.e. does not have a solar cell) which corresponds to the area which would be occupied by the sixteenth solar cell in a regular 4×4 pattern. The solar cells 106 are cabled to one another and have, preferably on the back, one possibility for tapping the generated solar current (cabling and tap not shown). In this connection for example it can be a socket or cable terminal.

The distance 108 from the edges 109 corresponds roughly to one twentieth of the edge length of the square shape 101. The distance 108 can however as required also be chosen differently and is preferably greater than 2 cm. In particular the distance 108 can be roughly 3.5 cm. The distance 107 between adjacent solar cells 106 can likewise be either the same size, smaller or even larger. In the figure the distance 107 is roughly one tenth of the distance 108. The distance 108 is preferably chosen such that it corresponds essentially to the width of the overlapping regions 12 in the direction perpendicular to the edges 13 in an installation according to base panels 3 of FIGS. 1-3. Thus, in the version as a photovoltaic module of the panel 100 the result is that by overlapping of adjacent panels the active surface of the solar cells 106 is not reduced. For the same reason the cleared region 110 on the upper corner 103 is also preferably dimensioned such that in installation according to the base panels 3 of FIGS. 1-3 it corresponds to the overlapping region 11.1 and 11.2 of the panels, for example 3.1-3.3, adjacent in the direction of the line of slope A.

Within the framework of the preferred execution of the distances 108 and of the region 110 which are dictated by the arrangement of the panels 100 in the covering as claimed in the invention, however the distance 107 and the size and the number of the individual solar cells 106 can be matched as required. For example it is also conceivable to arrange only 8 solar cells in a regular 3×3 pattern, in turn the missing field being formed on the top corner. Likewise strip-shaped solar cells can be used which leave open the regions on the panel 100 which are preferably to the kept open.

The panel 100 similarly to the version of the base panels 3 of FIGS. 1-3 have a top 111 through opening and a bottom through opening 112. The through opening 112 is made in a corner region free of solar cells on the corner 102. The through opening 112 passes through the outside panel 104 and the rear panel or film 105 and rests on the line of slope A which passes through the corners 102 and 103 of the panel 100.

The top through opening 111 is made in the region 110 which is free of solar cells. In particular the through opening 111 is made on the bottom corner 113 of the square region 110 and likewise lies on the line of slope A. But it is also conceivable to form the through openings on other regions of the panel 100 which are free of solar cells. Depending on the arrangement of the panels 100 in a covering and/or fastening arrangements for attachment of the panels 100 the through openings can also be located in the region between two solar cells and/or not lying on the line of slope A.

The invention claimed is:

1. A weatherproof building envelope for mounting to a sloped roof, comprising:
    quadrilateral weatherproof panels, each of the panels having a translucent top layer and a bottom layer with solar cells affixed between the top and bottom layers for providing solar power, each of the panels having a lower and an upper through opening at opposing corners of the panel in line with the sloped roof for receiving a fastener to mount each of the panels transversely in line with the sloped roof; and;
    a holding element having a top sealing panel and a base panel defining a slot opening therebetween for inserting the corner of a first panel of the quadrilateral panels with the upper through opening therein and for mounting the corner of a second panel of the quadrilateral panels with the lower through opening overlapping the first panel on a top surface of the top sealing panel and the upper and lower through openings of the first and second panels in alignment with each other for receiving a fastener to fixedly attach both the first and second panels to the sloped roof in a watertight engagement with each other, respectively.

2. A weatherproof building envelope for mounting to a sloped roof of claim 1, wherein the top sealing panel and the base panel are quadrilateral panels corresponding to configuration of the opposing corners of each of the weatherproof quadrilateral panels.

3. A weatherproof building envelope for mounting to a sloped roof of claim 2, wherein the base panel includes an extension beyond the quadrilateral shape opposite the slot opening to define an attachment clip having a through opening thereon for receiving a fastener to fixedly attach the attachment clip in line with the sloped roof.

4. A weatherproof building envelope for mounting to a sloped roof of claim 2, wherein the weatherproof panels are installed with respect to a generally vertical line with the sloped roof in a diagonal position to mutually overlap each other a predetermined distance to form a weathertight seal between overlapping weatherproof panels.

5. A weatherproof building envelope for mounting to a sloped roof of claim 1, wherein adjacent ones of weatherproof panels are arranged next to one another at the same height with respect to the sloped roof and are spaced apart from one another in a direction perpendicular to the sloped roof a predetermined distance to overlap each other and a portion of the holding element to maintain the weathertight seal between the adjacent weatherproof panels.

6. A weatherproof building envelope for mounting to a sloped roof of claim 1, wherein each of the weatherproof panels are a glass panel equipped with solar cells.

7. A weatherproof building envelope for mounting to a sloped roof of claim 1, wherein the top sealing panel is the same thickness as the weatherproof panels and a shape matching the shape of the opposing corners of the weatherproof panels.

8. A weatherproof budding envelope for mounting to a sloped roof of claim 1, further including a fastener, wherein the fastener is inserted in the upper and lower through openings of the first and second panels, respectively, to form a weathertight seal with the top sealing panel when affixed to the sloped roof.

9. A method for attaching weatherproof quadrilateral panels to a building roof, comprising the steps of:
    a) providing a plurality of weatherproof panels;
    b) installing the panels with respect to a line of slope of the building roof in a diagonal position with through openings on opposing corners of each panel and mutual overlapping of the panels in the direction of the roof slope;
    c) arranging and overlapping adjacent ones of the panels next to one another at the same height with respect to the line of slope and mutually spacing apart from one another in a direction perpendicular to the line of slope;
    c) connecting overlapping panels in the line of slope through upper and lower through openings on each panel with a fastener; and
    d) suspending the overlapping panels above the building roof by a holding element having a slot between an upper sealing element and a lower base element for receiving one of the plurality of weatherproof panels therein, the holding element having a through opening on the upper sealing element and lower base element corresponding and aligned with the upper and lower through openings on overlapping panels to affix the overlapping panels to the roof of the building by the fastener extending through the through openings of the holding element and the overlapping panels into the building roof.

10. A method for attaching weatherproof quadrilateral panels to a building roof of claim 9, wherein the holding element includes an attachment clip opposite the slot and in the line of slope having a through opening for receiving a fastener to fixedly attach the attachment clip to the building roof.

11. A method for preparing a building envelope with several quadrilateral weatherproof panels, comprising the steps of:

a) providing a plurality of weatherproof panels;
b) installing the weatherproof panels with respect to a line of slope of a building roof in a diagonal position with mutual overlapping, each of the panels including an edge region with an upper corner and a lower opposing corner and said mutual overlapping including an arrangement wherein directly adjacent weatherproof panels overlap each other over at least part of a length of their edge regions;
c) arranging adjacent ones of the weatherproof panels next to one another at the same height with respect to the line of slope and mutually spaced apart a predetermined distance from one another in a direction perpendicular to the line of slope;
d) connecting the overlapping weatherproof panels to a bearing structure of the roof by connecting the upper corner of one panel to the lower corner of the overlapping panel with respect to the line of the slope; and
e) suspending and sealing the one panel to the overlapping panels above the roof by a holding element having a sealing top element and a base element in contact with the roof of the building and affixedly attached thereto by a fastener passing through the overlapping panels and the holding element.

* * * * *